(12) United States Patent
Munkberg et al.

(10) Patent No.: US 9,465,212 B2
(45) Date of Patent: Oct. 11, 2016

(54) FLEXIBLE DEFOCUS BLUR FOR STOCHASTIC RASTERIZATION

(75) Inventors: Carl J. Munkberg, Malmo (SE); Robert M. Toth, Lund (SE)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 13/541,999

(22) Filed: Jul. 5, 2012

(65) Prior Publication Data

US 2013/0257866 A1     Oct. 3, 2013

Related U.S. Application Data

(60) Provisional application No. 61/616,566, filed on Mar. 28, 2012.

(51) Int. Cl.
G02B 27/00      (2006.01)
G06T 15/50      (2011.01)

(52) U.S. Cl.
CPC ......... G02B 27/0075 (2013.01); G06T 15/503 (2013.01)

(58) Field of Classification Search
CPC .................. G06T 5/003; G06T 2207/20201; G06T 15/503; H04N 21/4318; G02B 27/0075
USPC .......................................... 345/581, 611, 619
See application file for complete search history.

(56) References Cited

U.S. PATENT DOCUMENTS

| | | | |
|---|---|---|---|
| 5,225,940 A * | 7/1993 | Ishii et al. .................... | 359/823 |
| 7,885,454 B1 | 2/2011 | Kass | |
| 8,260,131 B2 | 9/2012 | Sundstrom | |
| 8,320,755 B2 | 11/2012 | Nakamura | |
| 2004/0103341 A1 * | 5/2004 | DeMeo et al. .................... | 714/6 |
| 2007/0280549 A1 * | 12/2007 | Ohnishi ......................... | 382/255 |
| 2008/0024490 A1 * | 1/2008 | Loop et al. .................... | 345/421 |
| 2008/0310757 A1 * | 12/2008 | Wolberg et al. ............. | 382/285 |
| 2009/0079957 A1 * | 3/2009 | Pomerantz ................... | 356/4.03 |
| 2009/0189917 A1 * | 7/2009 | Benko et al. ................. | 345/647 |
| 2009/0310149 A1 * | 12/2009 | Kawasaki ...................... | 358/1.8 |
| 2010/0085351 A1 * | 4/2010 | Deb et al. ..................... | 345/419 |
| 2010/0213891 A1 * | 8/2010 | Nishikawa et al. .......... | 320/106 |
| 2010/0283919 A1 * | 11/2010 | Cernasov ..................... | 348/739 |
| 2011/0164867 A1 | 7/2011 | Hamada | |

OTHER PUBLICATIONS

Bradley, Real-Time Depth of Field Rendering, Dec. 2005, The University of British Columbia, pp. 1-6.*
Lee, et al., Real-Time Depth-of-Field Rendering Using Anisotropically Filtered Mipmap Interpolation, Sep. 29, 2008, IEEE Transactions on Visualization and Computer Graphics, vol. 15, No. 3, pp. 453-464.*
Nagahara, et al., Flexible Depth of Field Photography, Oct. 2008, European Conference on Computer Vision (ECCV), pp. 1-14.*

(Continued)

*Primary Examiner* — Maurice L McDowell, Jr.
(74) *Attorney, Agent, or Firm* — Trop Pruner & Hu, P.C.

(57) ABSTRACT

User-controllable defocus blur for a stochastic rasterizer may be implemented by modifying circle of confusion coefficients per vertex to express more general defocus blur. The method can be applied to limit the foreground blur, extend the in-focus range, simulate tilt-shift photography, and specify per-object defocus blur. Furthermore, with two simplifying assumptions, existing triangle coverage tests and tile culling tests can be used with very modest modifications.

25 Claims, 4 Drawing Sheets

(56) References Cited

OTHER PUBLICATIONS

Beier, et al., Featre-Based Image Metamorphosis, Jul. 26-31, 1992, Computer Graphics, 26, 2, pp. 1-8.*
Engel, ShaderX2: Shader Programming Tips & Tricks with DirectX 9, 2004, Worldware Publishing, Inc., pp. 1-729.*
Akenine-Moller, Tomas, et al. "Efficient Depth of Field Rasterization Using a Tile Test Based on Half-Space Culling." Computer Graphics Forum, 31, 1, Blackwell Publishing Ltd, 2012, 3-18, 1, 3.
Demers, J., Depth of Field: A survey of Techniques. In GPU Gems, Fernando R., (Ed.). Addison-Wesley, 2004, pp. 375-390, 1.
Hammon, Earl Jr., "Practical Post-Process Depth of Field." In GPU Gems 3, Nguyen H., (Ed.). Addison-Wesley, 2007, chapter 28, pp. 583-606, 1.
Kosloff, T, J. et al., Three Techniques for Rendering Generalized Depth of Field Effects. In Proceedings of the Fourth SIAM Conference on Mathematics for Industry: Challenges and Frontiers (M109) (Oct. 2009), pp. 42-48, 1, 4.
Kolb, C., et al., A Realistic Camera Model for Computer Graphics. In Computer Graphics (Proceedings of SIGGRAPH 95) (1995), pp. 317-324, 1.
Kosara, R., et al., Semantic Depth of Field. In Proceedings IEEE Information Visualization (2001), pp. 97-104, 1.
Laine, S., et al., Clipless Dual-Space Bounds for Faster Stochastic Rasterization. ACM Transactions on Graphics, 30, 4 (201), 106:1-106:6, 1, 3, Jul. 2011.
Laine, S., et al., "Efficient Triangle Coverage Tests for Stochastic Rasterization," Technical Report NVR-2011-003, NVIDIA, Sep. 2011, 2.
Laine, S., et al., "Improved Dual-Space Bounds for Simultaneous Motion and Defocus Blur," Technical Report NVR-2011-004, NVIDIA, Nov. 2011, 3.
Lee, S., et al., Real-Time Lens Blur Effects and Focus Control. ACM Transactions on Graphics, 29, 4 (2010), 65: 1-7, 1, 3.
Munkberg, J.L., et. al., "Backface Culling for Motion Blur and Depth of Field," Journal of Graphics, GPU, and game tools 15, 2 (2011), 123-139. 3, 5.
Munkberg, J.L., et al., "Flexible Defocus Blur for Stochastic Rasterization," In Eurographics Symposium on Rendering, 2012, pp. 1-5.
Munkberg, J.L., et. al., "Hyperplane Culling for Stochastic Rasterization," In Eurographics, 2012—Short Papers, (2012). 1, 3.
Potmesil, M., et al., "A Lens and Aperture Camera Model for Synthetic Image Generation," In Computer Graphics (Proceedings of SIGGRAPH 81), (1981), pp. 297-305, 1.
PCT International Search Report and Written Opinion issued in corresponding PCT/US2013/033860 dated Jul. 26, 2013 (11 pages).
Taiwan Search Report issued in corresponding TW application No. 102110861 dated Jan. 15, 2015 (2 pages).
Laine, S., et al., "Efficient Triangle Coverage Tests for Stochastic Rasterization," NVIDIA Research, 2011 (4 pages).
Lee, S., et al., "Real-Time Depth-of-Field Rendering Using Anisotropically Filtered Mipmap Interpolation," 2009 IEEE Transactions on Visualization and Computer Graphics, vol. 15, No. 3 (13 pages).
Munkberg, J., et al., "Backface Culling for Motion Blur and Depth of Field," 2010 (15 pages).
TW Search Report in corresponding TW patent application 102110861 dated Jan. 15, 2015 (2 pages), [w/English translation].
TW Search Report in corresponding TW patent application 102110861 dated Jul. 24, 2015 (2 pages), [w/English translation].

\* cited by examiner

FLEXIBLE DEFOCUS BLUR FOR STOCHASTIC RASTERIZATION

CROSS-REFERENCE TO RELATED APPLICATIONS

This application is a non-provisional application claiming priority to provisional application Ser. No. 61/616,566 filed on Mar. 28, 2012, hereby expressly incorporated by reference herein.

BACKGROUND

This relates to graphics processing.

Digital artists and game developers often want non-physically-based control over depth of field (DOF) parameters. Useful examples include the possibility to limit foreground blur or to extend the in-focus range while preserving the foreground and background blur. With post-processed DOF approaches, this is straightforward since the blur filter is expressed as a user-provider function of the scene depth.

In semantic depth of field the amount of DOF is controlled on a per-object basis. A set of depth-sorted layers or billboards, which are individually blurred and composited into a final image may be used. However, visibility is never resolved correctly using the above methods, and consequently, their use is limited.

A physically-based camera model can be simulated with distributed ray tracing through a set of lenses and apertures. Non-linear ray tracing (by tracing bent rays) may simulate non-physical effects such as multiple focus planes. Each pixel may have a unique ray distribution. In general, each point in three-dimensional (3D) space can have a different blur value.

Flexible defocus blur allows for varying lens parameters for each pixel to emulate effects like tilt-shift photography, curvature of confusion, and lens aberrations. Visibility is resolved by ray tracing through a layered depth image. User-provided camera space DOF constraints are interpolated using a least-squares fit to derive varying per-pixel lens parameters. It is far from straightforward to extend these ray tracing approaches to handle simultaneous motion blur and depth of field.

State-of-the-art stochastic rasterizers, e.g. RenderMan, have fully programmable surface and displacement shading, and extensive global camera control, where the aperture shape and density can be adjusted. To the best of our knowledge, however, there is no publicly known flexible DOF approach for stochastic rasterizers with local control, such that the blur amount can be controlled per-vertex.

BRIEF DESCRIPTION OF THE DRAWINGS

Some embodiments are described with respect to the following figures.

DETAILED DESCRIPTION

Figure 1:
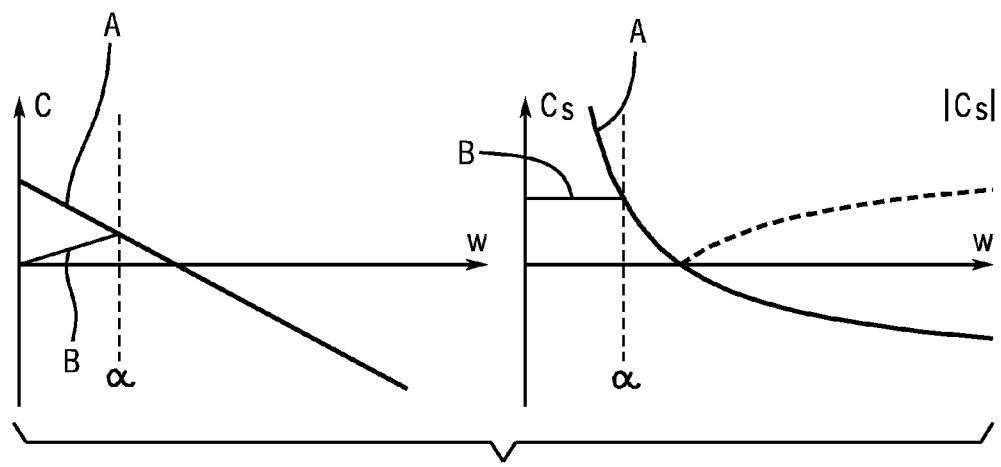
FIG. 1 shows a circle of confusion radius in clip space on the left and in screen space on the right.

We present user-controllable and plausible defocus blur for a stochastic rasterizer. We modify circle of confusion coefficients per vertex to express more general defocus blur, and show how the method can be applied to limit the foreground blur, extend the in-focus range, simulate tilt-shift photography, and specify per-object defocus blur. Furthermore, with two simplifying assumptions, we show that existing triangle coverage tests and tile culling tests can be used with very modest modifications. Our solution is temporally stable and handles simultaneous motion blur and depth of field.

Our goal in some embodiments is flexible DOF that works directly in a stochastic rasterizer without any layer-generation passes, iterative solvers, and with minimal impact on pipeline design and rendering optimizations. Specifically, we want to explore how user-defined DOF control can be integrated with efficient tile-based traversal for higher-dimensional rasterization.

We let the user specify circle of confusion parameters for every vertex in a mesh. This enables user control of defocus blur for stochastic rasterization, while still supporting the standard thin lens model as a subset. In addition, we also introduce two simplifying assumptions that make this approach compatible with state-of-the-art per-tile tests and coverage tests in 4D and 5D rasterizers, and handle simultaneous motion blur and DOF. The streaming nature of rasterization also enables interesting features, such as per-triangle DOF control and reduced DOF for specific depth ranges, which are not easily supported by ray tracing-based approaches. Finally, we show that our model not only can be used for added artistic control, but is also a useful tool to reduce performance variations for scenes rendered with defocus blur.

Let us first revisit the standard assumptions of a stochastic rasterizer. A clip-space vertex of a triangle is denoted $p=(x, y, w)$. In the thin lens model, the signed clip-space circle of confusion radius, $C$, for $p$ is a linear function of the vertex depth, $w$, i.e., $C(w)=a+wb$, where $a$ and $b$ are constants derived from the camera's aperture size and focal distance. The clip space vertex position for a specific lens position, $(u, v)$, is given by: $p'(u, v)=p+C(w)(u, kv, 0)$, which is a shear in clip space $x$ and $y$. The scalar, $k$, adjusts for non-square aspect ratios, and the focus plane is located at $w=F$.

The screen space blur radius, $C_s=C/w$, goes towards infinity for $w \to 0$, so a small out-of-focus object very close to the camera can easily cover the entire screen. This is in contrast to most post-processing DOF methods, where the screen space defocus blur is limited to a certain maximum radius, which is physically incorrect, but has more predictable performance.

As an illustrative example, we limit the screen space blur, $C_s$, to a certain radius, $R$, in the foreground region $$(w<F) \cdot C_s = R \text{ for } w = \frac{a}{R-b} = \alpha.$$

This leads to the following definitions:

$$C_s = \begin{cases} \dfrac{a+wb}{w}, & w > \alpha, \\ R & w \le \alpha, \end{cases} \quad (1)$$

which is equivalent to the following formula in clip space:

$$C = \begin{cases} a + wb, & w > \alpha, \\ wR & w \le \alpha. \end{cases} \quad (2)$$

Equations 1 and 2 are illustrated in FIG. 1. FIG. 1 is a circle of confusion radius in clip space and screen space. The curves A show the functions obtained by the thin lens model. The curves B show the functions obtained after limiting the foreground blur.

C is a piecewise linear function of the vertex depth, and the thin lens property that C can be linearly interpolated over the triangle does not hold. Therefore, we introduce the assumption that the clip space circle of confusion radius is linear in the interior of a triangle. With this assumption, we can compute C in the vertex shader using Equation (2) and provide these coefficients instead of the global camera parameters when positioning and coverage-testing the triangle for a certain lens position. The stochastic rasterizer is essentially unmodified in some embodiments, and the amount of defocus blur is now an attribute that can be controlled on vertex granularity for added artistic control.

Figure 2:
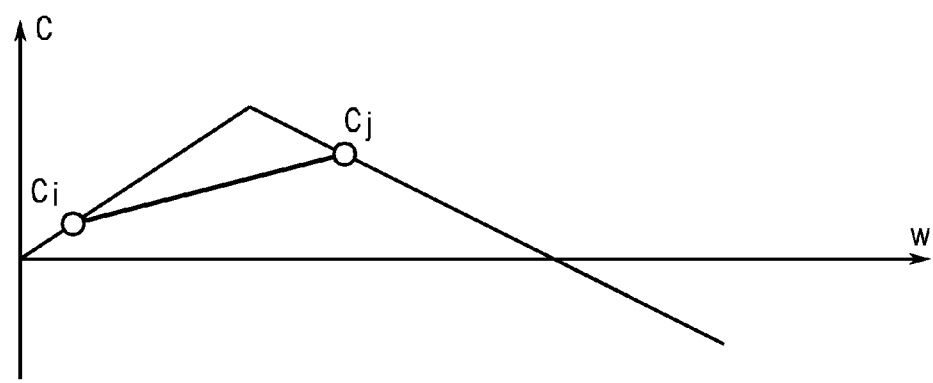
FIG. 2 shows linearization errors for triangles that span discontinuities.

Any triangle straddling the discontinuity in C will have a somewhat different circle of confusion in the interior than what is described by the piecewise linear C function, as illustrated in FIG. 2. FIG. 2 shows linearization errors are introduced for triangles that span discontinuities in C. This effect is most visible on very large triangles, and is negligible in a micropolygon pipeline. Also, geometry with T-junctions may show cracks with this assumption. We see this as yet another reason to completely avoid T-junctions.

We generalize the user-controllable DOF to 5D stochastic rasterization, where the fifth dimension is shutter time. We assume linear vertex motion in clip space, i.e., $p(t)=(1-t)q+tr$. With the thin lens model, the signed clip space circle of confusion radius, C, of a moving vertex, $p(t)$, is a linear function in t: $C(t)=C(w(t))=a+w(t)b$. The clip space vertex position for a time, t, and lens position, uv, is given by:

$$p'(u, v, t)=p(t)+C(t)(u, kv, 0) \quad (3)$$

If C is replaced by a non-linear function in t, efficient triangle coverage tests (per tile and per sample) in 5D no longer work. We therefore introduce another simplification, namely that the clip space circle of confusion radius of a vertex is a linear function in time within the frame. The user provides two circle of confusion coefficients for each vertex per frame, namely $c_0$ at $t=0$ and $c_1$ at $t=1$. During rasterization, we use $C(t)=(1-t)c_0+tc_1$ to determine the triangle's position for a time, t, and lens position, uv, in Equation (3). If the user provides the standard thin lens coefficients, e.g., $c_0=a+b\ w(0)$ and $c_1=a+b\ w(1)$, the rendered image is identical to that of a standard 5D rasterizer.

Next we outline pipeline differences between a rasterizer where the clip space circle of confusion C is a user-provided vertex attribute compared to a rasterizer that assumes a thin lens model.

The sample coverage test of a stochastic rasterizer can be slightly optimized if C is a linear function of w. Compared to a test that handles arbitrary C-coefficients, the difference is arithmetic cost is 16 vs. 18 FMA (fused-multiply add) operations for a DOF coverage test. For a 5D coverage test, the difference is 25 vs. 30 FMA operations.

Some stochastic rasterizers also perform coverage tests in 5D per tile to quickly discard samples that cannot hit the triangle. It is easy to verify that the tile culling tests from previous work still work as long as C varies linearly over the triangle and varies linearly in t within the frame, which are exactly the two assumptions we introduced above. The same hold for view-frustum culling and screen space bounding.

A backface culling test for 5D rasterization can be slightly optimized for the thin lens model. We show the expression for a 5D backface test that support user-provided C-coefficients below and compare it to the thin-lens version.

A 5D backface test for flexible blur may be implemented as follows:

A backface culling test for DOF is expressed as a determinant test:

$$p'_0(u, v) \cdot (p'_1(u, v) \times p'_2(u, v)) > 0, \quad (4)$$

where $p'_i(u,v)=p_i+C_i(u, kv, 0)$. This can be expanded to:

$$p_0 \cdot (p_1 \times p_2)+(u, kv, 0) \cdot (C_0 p_1 \times p_2 + C_1 p_2 \times p_0 + C_2 p_0 \times p_1) > 0. \quad (5)$$

If C follows the thin lens model, e.g., $C_m=a+bw_m$, the expression can be simplified to:

$$p_0 \cdot (p_1 \times p_2)+a(u, k\ v, 0) \cdot (p_0 \times p_1+p_1 \times p_2+p_2 \times p_0) > 0. \quad (6)$$

For user-provided C-coefficients, this optimization must of course be disabled.

A similar argument holds for the 5D backface test. The 5D version of Equation (2) contains terms on the form:

$$p_0(t) \cdot (p_1(t) \times p_2(t)) \text{ and } (u, k\ v, 0) \cdot (C_m(t) p_n(t) \times p_o(t)), \quad (7)$$

where each $C_m=(1-t)c_0+tc_1$ is a linear function in t determined by user-provided vertex attributes $c_0$ and $c_1$. Thus, Equation (7) contains $t^3$, $ut^3$, and $vt^3$ terms, which must be bounded over the lens and shutter interval to conservatively cull a triangle.

The thin lens version of the 5D backface test has simplified terms (c.f., Equation (3)):

$$p_0(t) \cdot (p_1(t) \times p_2(t)) \text{ and } a(u, kv, 0) \cdot (p_n(t) \times p_o(t)). \quad (8)$$

which have lower order polynomial coefficients $t^3$, $ut^2$ and $vt^2$. Thus, a backface test with user-provided C-coefficients is slightly harder to bound.

In a rasterizer, the per-vertex circle of confusion parameter, C, simply indicates how much an object should be sheared for a specific lens coordinate, and is an object-specific parameter. In a ray tracer, however, the geometry is expressed in a global coordinate system, and individual shears per object mean that the distribution and angles of rays from the camera lens are unique for each triangle. This would require sending "bent rays" through the scene, which makes the ray traversal step much more complicated.

Figure 3:
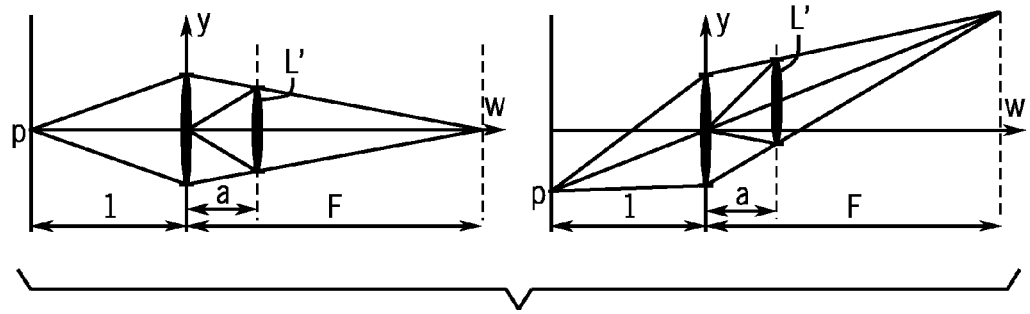
FIG. 3 shows the effect of limiting foreground blur in a ray tracer.

Some special cases, like limiting foreground blur can be handled as shown in FIG. 3, limiting foreground blur in a ray tracer. The global lens is replaced by a per-pixel lens, L', inserted at depth w=a centered around the ray through the pixel and the pinhole camera. It focal length, $$f = \frac{F}{\alpha(F - \alpha)},$$

is chosen such that the blur in the region w>a is unaffected. Rays are now traced from a pinhole camera at w=0 towards the lens and each live ray is refracted in the lens. This is shown for two different points, p, on the image plane, using a unique lens per screen space sample, that is inserted in the scene. This is cumbersome, and is very likely to completely disable certain traversal optimizations for primary rays. A stochastic rasterizer, on the other hand, handles these cases easily with our algorithm, with none or very modest performance implications.

On the other hand, in a rasterizer designed around the thin-lens model, it is hard to simulate effects that vary as functions of the position on the lens, such as general lens aberrations. Our extension with user-provided C-coefficients per vertex only modifies the amount the vertex is sheared in x and y in clip space, and is assumed to be a linear function in u and v, where the shears in x and y are independent. That said, the rasterizer could be extended with more defocus parameters per vertex, defining the coefficients of a function C=f(u, v, t) to support more elaborate lens models. This would, however, complicate the coverage and cull tests significantly.

A difficult scenario for user-defined blur per-vertex is a large triangle spanning the focus plane. When gradually reducing the foreground blur, the focus distances appear to move. This is an effect of the assumption that the defocus blur varies linearly over the triangle (e.g., FIG. 2). With higher tessellation rates, this effect is hardly noticeable.

It is important to note that it is hard to guarantee an upper bound, R, for defocus in all cases. For triangles straddling both w=0 and w=F, the screen space blur radius is not bounded by R as C(w=0)≠0. However, with reasonably tessellated scenes, our approach has the potential to greatly improve the average rasterization performance.

Figure 4:
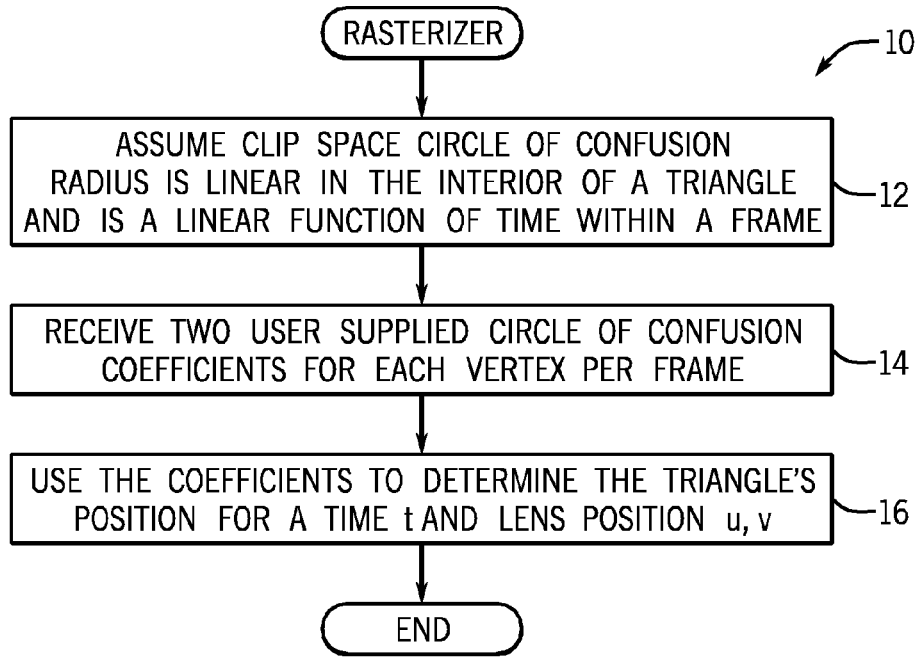
FIG. 4 is a flow chart for one embodiment.

Referring to FIG. 4, a sequence 10 may be implemented in software, firmware and/or hardware. In software and firmware embodiments it may be implemented by computer executed instructions stored in one or more non-transitory computer readable media. Examples of computer readable media include magnetic, optical and semiconductor storages.

Referring again to FIG. 4, the sequence 10 begins by assuming that the clip space circle of confusion radius is linear in the interior of a triangle. It is also assumed that the clip space circle of confusion radius is a linear function of time within a frame as indicated in block 12. Then two user supplied circle of confusion coefficients are received for each vertex per frame as indicated in block 14. Finally the coefficients are used to determine the triangle's position for a time t in lens position u,v as indicated in block 16.

Figure 5:
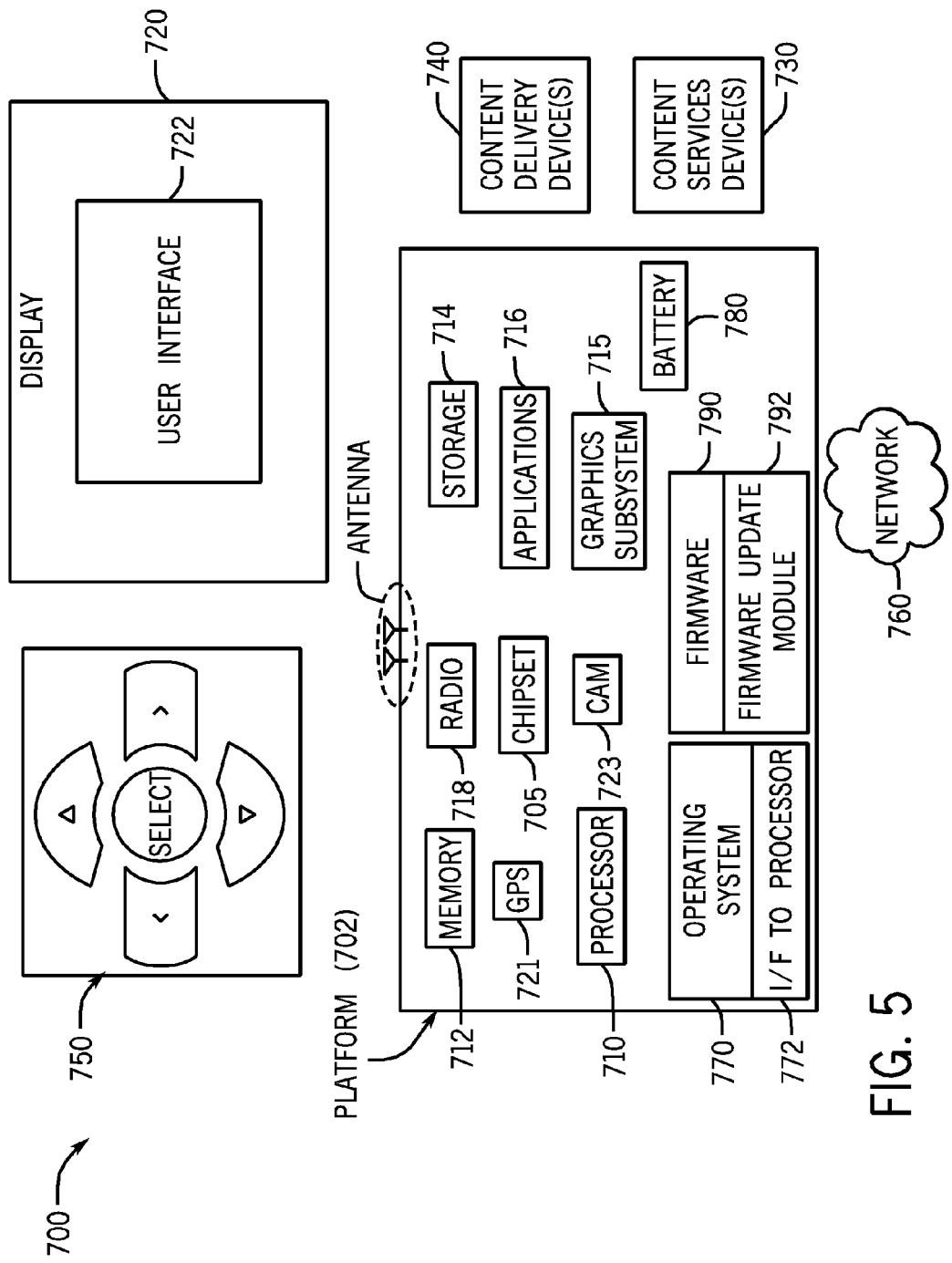
FIG. 5 is a system depiction for one embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module 792 to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequence shown in FIG. 4 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
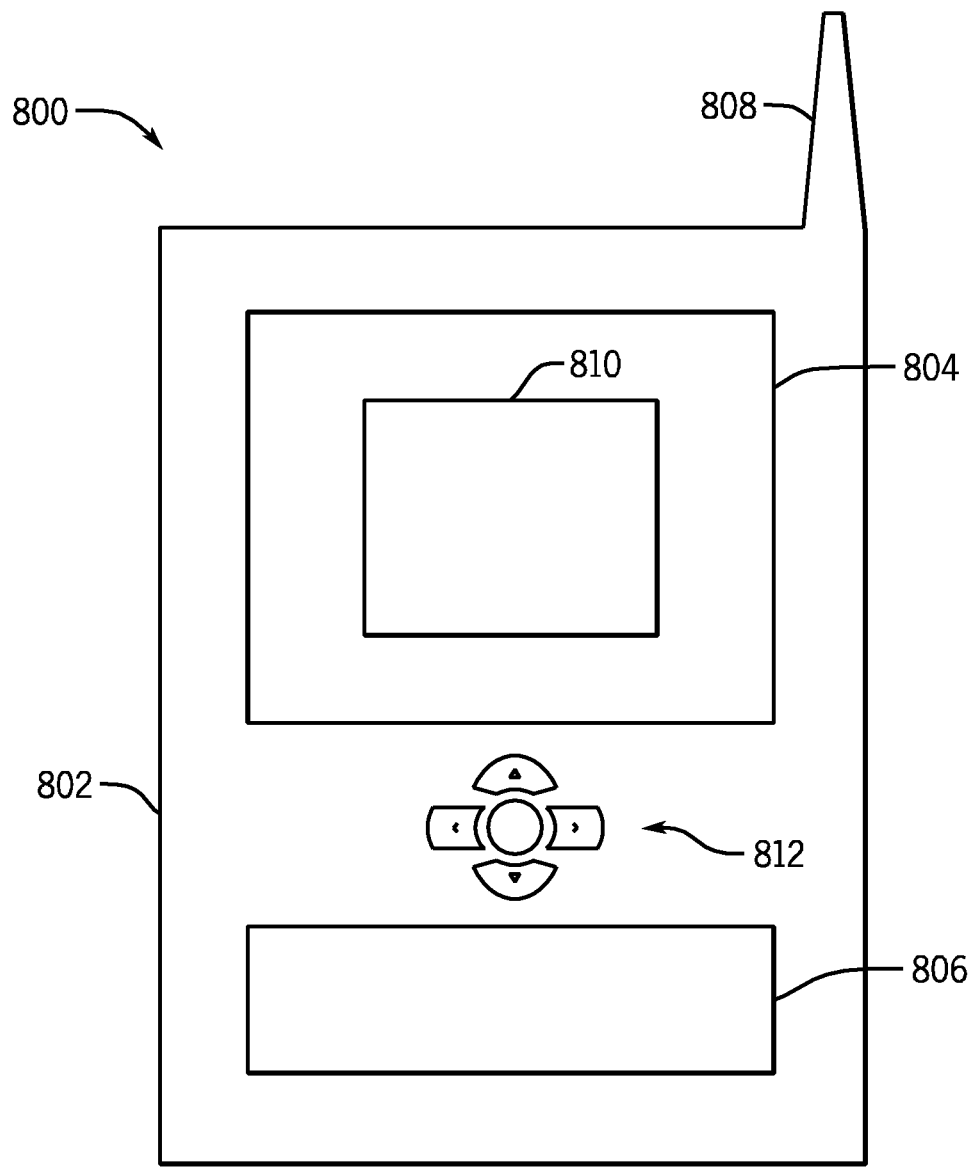
FIG. 6 is a front elevation view for one embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 800 may comprise a housing 802, a display 804, an input/output (I/O) device 806, and an antenna 808. Device 800 also may comprise navigation features 812. Display 804 may comprise any suitable display unit 810 for displaying information appropriate for a mobile computing device. I/O device 806 may comprise any suitable I/0 device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be a method comprising enabling a user of graphics processor to specify circle of confusion parameters for every vertex in a mesh. The method may include assuming the clip space circle of confusion radius of a vertex is a linear function of time within a frame. The method may include assuming the clip space circle of confusion radius is linear in the interior of a triangle. The method may also include receiving user supplied circle of confusion coefficients for each vertex per frame. The method may include using said coefficients during rasterization to determine the triangle's position for a time and lens position. The method may also include implementing a five dimensional backface test for flexible blur. The method may also include limiting foreground blur in a rasterizer.

Another example embodiment may include at least one machine readable medium comprising a plurality of instructions and, in response to being executed on a computing device, causing the computing device to carry out a method according to any one of methods in the paragraph above.

One example embodiment may be an apparatus comprising a processor to enable a user of graphics processor to specify circle of confusion parameters for every vertex in a mesh; and a memory coupled to said processor. An apparatus may include an operating system, a battery and firmware and a module to update said firmware. An apparatus may include said processor to operate with the clip space circle of confusion radius of a vertex as the linear function of time within a frame. An apparatus may also include said processor to operate with the clip space circle of confusion as linear in the interior of a triangle. An apparatus may also include said processor to receive user supplied circle of confusion coefficients for each vertex per frame. An apparatus may include said processor to use the coefficients during rasterization to determine the triangle's position for a time and lens position. An apparatus may also include said processor to implement a five dimensional backface test for flexible blur. An apparatus may also include said processor to limit foreground blur in a rasterizer. An apparatus may also include a processor in the form of a graphics processing unit. An apparatus may also include said processor to use two user supplied circle of confusion coefficients for each vertex per frame.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   enabling a user of a graphics processor to specify two circle of confusion coefficients, each coefficient for a different time, for each vertex in a mesh per frame; and
   making a clip space circle of confusion radius of a vertex a linear function of time within a frame.

2. The method of claim 1 including making a clip space circle of confusion radius linear in the interior of a triangle that is a graphical object that spans a discontinuity of the clip space circle of confusion.

3. The method of claim 1 including using said coefficients during rasterization to determine a triangle's position for a time and lens position.

4. The method of claim 1 including implementing a five dimensional backface test for flexible blur.

5. The method of claim 1 including limiting foreground blur in a rasterizer.

6. An apparatus comprising:
   a graphics processor to enable a user to specify two circle of confusion coefficients, each coefficient for a different time, for each vertex in a mesh per frame and to make a clip space circle of confusion radius linear in the interior of a triangle that is a graphical object that spans a discontinuity of the clip space circle of confusion, said processor to operate with a clip space circle of confusion radius of a vertex a linear function of time within a frame; and
   a memory coupled to said graphics processor.

7. The apparatus of claim 6 including an operating system.

8. The apparatus of claim 6 including a battery.

9. The apparatus of claim 6 including firmware and a module to update said firmware.

10. The apparatus of claim 6, said processor to operate with a clip space circle of confusion as linear in the interior of a triangle that is a graphical object.

11. The apparatus of claim 6, said processor to use the coefficients during rasterization to determine a triangle's position for a time and lens position.

12. The apparatus of claim 6, said processor to implement a five dimensional backface test for flexible blur.

13. The apparatus of claim 6, said processor to limit foreground blur in a rasterizer.

14. The apparatus of claim 6, said processor to use two user supplied circle of confusion coefficients for each vertex per frame.

15. A computer system comprising:
   a central processing unit;
   a graphics processor coupled to said central processing unit to enable a user of the graphics processor to specify two circle of confusion coefficients, each coefficient for a different time, for each vertex in a mesh per frame and to make a clip space circle of confusion radius linear in the interior of a triangle that is a graphical object that spans discontinuity of the clip space circle of confusion, said graphics processor to operate with a clip space circle of confusion radius of a vertex a linear function of time within a frame; and
   a memory coupled to said graphics processor.

16. The system of claim 15 including firmware and a module to update said firmware.

17. The system of claim 15 said processor to operate with a clip space circle of confusion as linear in the interior of a triangle that is a graphical object.

18. The system of claim 15 said processor to receive user supplied circle of confusion coefficients for each vertex per frame.

19. The system of claim 15 including an operating system.

20. The system of claim 15 including a battery.

21. One or more non-transitory computer readable media storing instructions executed by a graphics processor to perform a sequence comprising:
   enabling a user of a graphics processor to specify two circle of confusion coefficients, each coefficient for a different time, for each vertex in a mesh per frame and;
   making the clip space circle of confusion radius of a vertex a linear function of time within a frame.

22. The media of claim 21, said sequence including making the clip space circle of confusion radius is linear in the interior of a triangle that is a graphical object.

23. The media of claim 21, said sequence including using said coefficients during rasterization to determine a triangle's position for a time and lens position.

24. The media of claim 21, said sequence including implementing a five dimensional backface test for flexible blur.

25. The media of claim 21, said sequence including limiting foreground blur in a rasterizer.

* * * * *